United States Patent
Rieder et al.

(10) Patent No.: US 8,738,305 B2
(45) Date of Patent: May 27, 2014

(54) METHOD FOR DETECTING BLOCKAGE IN A CORIOLIS FLOW MEASURING DEVICE

(75) Inventors: Alfred Rieder, Landshut (DE); Wolfgang Drahm, Erding (DE); Hao Zhu, Munich (DE); Marcel Braun, Inzlingen (DE)

(73) Assignee: Endress + Hauser Flowtec AG, Reinach (CH)

( * ) Notice: Subject to any disclaimer, the term of this patent is extended or adjusted under 35 U.S.C. 154(b) by 1006 days.

(21) Appl. No.: 12/662,817

(22) Filed: May 5, 2010

(65) Prior Publication Data
US 2010/0281998 A1  Nov. 11, 2010

Related U.S. Application Data

(60) Provisional application No. 61/213,147, filed on May 11, 2009.

(30) Foreign Application Priority Data

May 8, 2009 (DE) ............ 10 2009 002 941
Apr. 15, 2010 (EP) ............ PCT/EP2010/054995

(51) Int. Cl.
*G01F 7/00* (2006.01)
(52) U.S. Cl.
USPC ............ 702/45; 702/48; 702/50; 702/56; 702/100; 702/103
(58) Field of Classification Search
USPC ............ 702/45, 48, 50, 56, 100, 103; 73/861.356
See application file for complete search history.

(56) References Cited

U.S. PATENT DOCUMENTS

| 4,911,020 A * | 3/1990 | Thompson | 73/861.356 |
| 5,423,221 A * | 6/1995 | Kane et al. | 73/861.355 |
| 7,421,350 B2 | 9/2008 | Duffill | |
| 2004/0064271 A1 | 4/2004 | Hays | |
| 2008/0047362 A1 | 2/2008 | Kassubek | |
| 2008/0141789 A1 | 6/2008 | Kassubek | |

FOREIGN PATENT DOCUMENTS

| DE | 699 28 422 T2 | 6/2006 |
| DE | 10 2007 061 690 A1 | 6/2008 |
| JP | 2003-194610 | 7/2003 |
| WO | WO 03/056282 A1 | 7/2003 |

OTHER PUBLICATIONS

English Translation of International Report on Patentability in corresponding International Application PCT/EP2010/054995.

* cited by examiner

*Primary Examiner* — Elias Desta
(74) *Attorney, Agent, or Firm* — Bacon & Thomas, PLLC

(57) ABSTRACT

A method for detecting blockage of a measuring tube of a Coriolis flow measuring device, which has at least two measuring tubes. For this, the at least two measuring tubes are excited by at least one exciter to execute mechanical oscillations, mechanical oscillations of the measuring tubes are registered by at least one sensor and at least one measurement signal representing the mechanical oscillations is produced. At least one produced measurement signal is analyzed for the occurrence of a deviation of a resonance frequency of one measuring tube relative to a resonance frequency of the at least one other measuring tube. In case such a deviation occurs, blockage of a measuring tube is established.

25 Claims, 5 Drawing Sheets

METHOD FOR DETECTING BLOCKAGE IN A CORIOLIS FLOW MEASURING DEVICE

CROSS-REFERENCE TO RELATED APPLICATION

This application is a Continuation or Divisional or Non-provisional which claims the benefit of U.S. Provisional Application No. 61/213,147 filed on May 11, 2009.

TECHNICAL FIELD

The present invention relates to a method for detecting blockage of a measuring tube of a Coriolis flow measuring device, wherein the Coriolis flow measuring device can be applied in a pipeline, and is embodied in such a manner that by it, a physical measured variable, especially the mass flow, viscosity and/or density of a fluid flowing in the pipeline can be determined, and wherein the Coriolis flow measuring device has at least two measuring tubes, into which the fluid flowing in the pipeline can be divided.

BACKGROUND DISCUSSION

According to the Coriolis principle, when in a system a rotating mass movement and a straight line mass movement extending, at least partially, perpendicularly to the rotational axis, superimpose, there then acts on the moved mass an additional force, which is referred to as the Coriolis force. This effect is utilized in known manner in Coriolis, flow measuring devices, for example, for ascertaining the mass flow of a fluid flowing in a pipeline. Coriolis, flow measuring devices have, as a rule, one or more measuring tubes, wherein these can, depending on type of device, be embodied in various configurations. The system of the at least one measuring tube forms an oscillatory system, which, depending on measuring tube configuration, has corresponding natural oscillation modes, such as, for example, bending oscillations (fundamental mode as well as modes of higher order), torsional oscillations (fundamental mode as well as modes of higher order), etc.

A Coriolis flow measuring device is applied for use in a pipeline, through which a medium flows, in such a manner that the fluid flows through the least one measuring tube. For determining a mass flow of the fluid, the at least one measuring tube is excited to execute oscillations by means of at least one exciter. The at least one exciter can, for example, be formed by an electromechanical exciter, especially an electrodynamic exciter, which exerts on the measuring tube a force corresponding to an applied voltage. As a rule, the oscillatory system is excited at a resonance frequency of the same (for example, the fundamental mode of the bending oscillation). If a fluid is not flowing through the at least one measuring tube, then the entire measuring tube oscillates in phase. If a fluid is flowing through the at least one measuring tube, then a Coriolis force acts on the moved mass (the fluid). This leads to the fact that, due to the Coriolis force, the measuring tube is additionally deformed, and a phase shift occurs along the direction of elongation of the measuring tube. The phase shift along a measuring tube can be detected by corresponding sensors, which can be formed by electromechanical, especially electrodynamic, sensors arranged spaced apart from one another, along the direction of elongation of the measuring tube. The phase shift, which can be registered via the sensors, is proportional to the mass flow through the measuring tube.

Additionally, or alternatively, to mass flow, the density of the flowing fluid can also be ascertained by Coriolis flow measuring devices. In such case, the principle utilized is that the resonance frequency (for example, the fundamental mode of the bending oscillation) depends on the oscillating mass, and with it, the density of the flowing fluid. By readjusting the excitation frequency in such a manner that the oscillatory system is excited in its resonance frequency, the resonance frequency, and from it, again, the density of the flowing fluid can be ascertained. Additionally, or alternatively, still other physical measured variables of the flowing fluid, such as, for example, viscosity, can be ascertained by Coriolis flow measuring devices.

Frequently, Coriolis flow measuring devices are used, which have two measuring tubes, inserted in parallel into the flow path, such that the fluid flowing in the pipeline is divided into the two tubes. As a rule, in use, the two measuring tubes are excited with opposite phase to one another. In this way, a decoupling of the oscillatory system, which has the two measuring tubes, from external vibratory influences is achieved. Additionally, the Coriolis flow measuring device can also have more than two measuring tubes, which, for example, are inserted in parallel into the particular flow path. In industrial applications, especially where high viscosity or inhomogeneous fluids are used, it can occur, that in the case of such Coriolis flow measuring devices, (at least) one of the measuring tubes becomes blocked. Such blockage is difficult to detect, since flow is still enabled through the at least one measuring tube remaining open. Especially with regard to hygienic requirements, it is, however, desirable to detect blockage of a measuring tube in Coriolis flow measuring devices as reliably and as early as possible.

In U.S. Pat. No. 7,421,350 B2, a flow measuring device is described, through which a material remaining in a measuring tube arrangement is detectable. For this, generally after emptying the flow measuring device, the measuring tube arrangement is excited to execute oscillations, and the response of the oscillations is registered. If the response of the oscillations exceeds a limit value, then it is established that residual material is still contained in the measuring tube arrangement. In accordance with a variant described in U.S. Pat. No. 7,421,350 B2, a standard resonance frequency for the flow measuring device is determined, which corresponds to a completely emptied state of the measuring tube arrangement. If, after emptying the measuring tube arrangement, the determined resonance frequency deviates from the standard resonance frequency by more than a predetermined value, then it is established that residual material is in the measuring tube arrangement. The steps explained above for determining whether the measuring tube arrangement is completely emptied, are, as a rule, first executed after emptying the flow measuring device. Accordingly, a prompt detection of blockage is not possible. Especially, in a condition in which fluid is flowing through the measuring tube arrangement, a shifting of the resonance frequency is not a reliable indicator for the occurrence of blockage. For example, such a shifting of the resonance frequency can also be brought about by a change in density of the fluid.

SUMMARY OF THE INVENTION

Accordingly, an object of the present invention is to provide a Coriolis flow measuring device as well as a method, by which blockage of a measuring tube in such a Coriolis flow measuring device, which has at least two measuring tubes, is detectable as reliably and as early as possible.

This object is achieved by a method for detecting blockage of a measuring tube of a Coriolis flow measuring device, as well as by a Coriolis flow measuring device.

The present invention relates to a method for detecting blockage of a measuring tube of a Coriolis flow measuring device, wherein the Coriolis flow measuring device can be applied in a pipeline, and is embodied in such a manner that by it, a physical measured variable, especially mass flow, viscosity and/or density, of a fluid flowing in the pipeline (e.g. liquid, gas) can be ascertained. In such case, the Coriolis flow measuring device includes: at least two measuring tubes, into which the fluid flowing in the pipeline can be divided. The method includes the following steps:

A) exciting by at least one exciter the at least two measuring tubes to execute mechanical oscillations;
B) registering the mechanical oscillations of the measuring tubes, and producing by at least one sensor at least one measurement signal representing the mechanical oscillations;
C) analyzing at least one produced measurement signal for the occurrence of a deviation of a resonance frequency of one measuring tube relative to a resonance frequency of the at least one other measuring tube; and
D) establishing blockage of a measuring tube upon the occurrence of such a deviation.

The present invention enables a prompt detection of blockage of a measuring tube of the Coriolis flow measuring device, since the method can also be put into practice under operating conditions in which fluid is flowing through the Coriolis flow measuring device. The method of the invention is based on the assumption that, upon the occurrence of blockage of a measuring tube, an asymmetry between the at least two measuring tubes is present as regards weight distribution and, accordingly, also as regards the oscillatory behavior of the individual measurement tubes. Then, in turn, via the oscillatory behavior of the measuring tubes, the presence of blockage can be concluded.

In such case, in experiments, it has been established that in most cases in which blockage of a measuring tube occurs, such an asymmetry with regard to the weight distribution is also present concurrently. For example, such an asymmetry arises in the following cases:

One measuring tube is filled with a different fluid than the at least one other measuring tube. This case arises especially when the blocked measuring tube is still filled with the fluid of the preceding application.

Gas bubbles are contained in the blocked measuring tube, which are not transported away, while the at least one remaining measuring tube is completely filled with liquid.

The material causing the blockage in a measuring tube has a different density than the relevant fluid.

Following an emptying of the Coriolis flow measuring device, the blocked measuring tube is still filled with material, while the other measuring tube is completely emptied.

Accordingly, through the method of the invention, in many applications, blockage of a measuring tube can be reliably detected.

The particular configuration of the measuring tubes is not critical for the present invention. The measuring tubes, in each case, can extend, especially, in a straight line, in a curve/arc, or be otherwise bent. Preferably, the measuring tubes are, in each case, embodied symmetrically to one another, and, accordingly, have (in the case of identical filling) the same oscillatory behavior, and thus also the same resonance frequencies. If this is not the case, then the measurement signal in step C must be analyzed for shifting, or for an increase of the difference of a resonance frequency of one measuring tube compared to a resonance frequency of the at least one other measuring tube. Additionally, it is preferably provided, that the Coriolis flow measuring device has exactly two measuring tubes. The fluid is preferably a liquid, which, depending on the application, can have different viscosities and, in given cases, can also entrain solids and/or gas inclusions.

If, during the step of registering (step B), a plurality of measurement signals are provided (by a plurality of sensors, for example), then, in step C, one or more of these measurement signals can be analyzed. Preferably, the steps for analyzing (step C) and for determining (step D) are performed in the Coriolis flow measuring device, especially by a correspondingly embodied electronics (analog and/or digital) of the Coriolis flow measuring device. Alternatively these steps can be completely or partially performed also by an external data processing unit, to which the corresponding measurement signals or information are transmitted (for example, via a network system). If, in step D, blockage of a measuring tube is established, then this can be displayed to a user (acoustically and/or optically) at the Coriolis flow measuring device and/or at an external data processing unit, or a corresponding alarm can be issued.

In an advantageous further development, the at least two measuring tubes are mechanically coupled to one another, and form an oscillatory system. Such a mechanical coupling leads to the fact that the oscillatory behavior of one measuring tube, in each case, is influenced also by the oscillatory behavior of the at least one other measuring tube. A mechanical coupling can be formed especially by at least one mechanical connection of the at least two measuring tubes, which especially can be provided at the input side and at the output side of the measuring tubes. As a rule, the measuring tubes of known Coriolis flow measuring devices are mechanically coupled to one another.

In an advantageous further development, in the step of exciting, the at least two measuring tubes are excited together. This enables the exciting of the measuring tubes to occur through one or more shared exciters. It is especially preferably provided, that two measuring tubes are excited in opposing directions, by a change of their relative separation. Such an exciting can occur, for example, by a change in length of an exciter arranged between the two measuring tubes. In an advantageous further development, in the step of registering, a relative change of separation between measuring tubes, especially between two measuring tubes, is registered. In corresponding manner, this change of separation can be registered, for example, via a change in length of a sensor arranged between the two measuring tubes.

In an advantageous further development, in the step of exciting, an excitation frequency of the at least two measuring tubes is controlled at a resonance frequency of an oscillatory system, which includes the at least two measuring tubes. Especially, the excitation frequency is controlled to the resonance frequency of the fundamental mode of the bending oscillation of the oscillatory system.

In an advantageous further development, in the step of analyzing, the occurrence of a deviation of the resonance frequencies is determined such that, in a frequency spectrum of an analyzed measurement signal, at least two marked peaks occur, each at a different frequency, wherein the analyzed measurement signal represents mechanical oscillations of an oscillatory system, which has the at least two measuring tubes. Accordingly, blockage of a measuring tube can be simply and reliably detected through analysis of the frequency spectrum of the measurement signal.

The preceding further development is based on the fact that when, due to blockage of a measuring tube, an asymmetry in the weight distribution of the individual measurement tubes is present (and, accordingly, the two measuring tubes, in each case, have different resonance frequencies), the oscillatory system, which has the at least two measuring tubes, has at least two resonance frequencies (for the relevant oscillation mode). For example, an oscillatory system, which is formed by two measuring tubes arranged symmetrically to one another, has, in the case of a complete filling of the measuring tubes with a first medium (in an given oscillation mode), a first resonance frequency, and in the case of a complete filling of the measuring tubes with a second medium having a different density, a second resonance frequency. If now, in the oscillatory system, one measuring tube is filled with the first medium, and the second measuring tube is filled with the second medium, then the oscillatory system (in the relevant oscillation mode) has two resonance frequencies, wherein the one resonance frequency lies near the first resonance frequency, and the other resonance frequency lies near the second resonance frequency. This can, among other things, be established by the above explained analysis of the frequency spectrum of the measurement signal for at least two marked peaks.

The term "peak" means, in such case, an (in given cases, local) maximum in a frequency spectrum, in which the oscillatory response behavior, such as, for example, the oscillation amplitude, is plotted versus frequency. The terminology "two marked peaks" means, in such case, that the peaks can be clearly differentiated. This can, for example, be defined such that the peaks must have a predetermined minimum frequency separation, and/or that the graph must decrease between the two peaks to a predetermined value or by a predetermined ratio. These criteria can differ, in such case, depending on application, especially depending on the fluids to be measured. In accordance with an advantageous further development, in the step of analyzing, the occurrence of a deviation of the resonance frequencies is established only in the case in which the frequency difference of the frequencies, at which the peaks occur, exceeds a predetermined limit value.

In an advantageous further development, the frequency spectrum is provided by varying the excitation frequency of the at least one exciter, and by registering the associated oscillation response behavior of the oscillatory system by at least one sensor. Preferably, in such case, the excitation frequency passes through the frequency range, which, with regard to the evaluation of the frequency spectrum, is relevant. In this way, the oscillation response behavior of the oscillatory system can be registered for the relevant frequency range. In an advantageous alternative further development, the frequency spectrum is provided by Fourier analysis of the analyzed measurement signal, wherein the excitation in the case recording of the measurement signal uses a frequency band extending over the relevant frequency range for excitation frequencies. Such a simultaneous exciting with a plurality of frequencies is, to some extent, also referred to as "white noise," and relates especially to an exciting uniformly distributed over the relevant frequency range.

In an advantageous further development, in the step of analyzing, a deviation of the resonance frequencies is detected by observing that when the at least two measuring tubes are excited at a resonance frequency of the oscillatory system, which includes the at least two measuring tubes, a change of a transfer function of the Coriolis flow measuring device relative to the transfer function in a non-blocked state occurs. The transfer function, in such case, relates an excitation input variable to a measurement signal representing the mechanical oscillations (of the oscillatory system). The excitation input variable is, in such case, a variable which is specifically for exciting (via the at least one exciter), such as, for example, an excitation voltage, or also an excitation energy, provided, or applied, to the exciter. The measurement signal, which represents mechanical oscillations (of the oscillatory system), describes, in such case, the oscillatory behavior, and can, for example, be formed by a sensor voltage provided by the at least one sensor.

Through the transfer function, for different excitation input variables, the corresponding measurement signal, which represents mechanical oscillations (of the oscillatory system), can, accordingly, be obtained or calculated. The transfer function can in corresponding manner also be applied in the opposite direction. Especially, the transfer function describes the response behavior of the oscillatory system, wherein the respective, device-specific parameters, such as, for example, properties of the at least one exciter and of the at least one sensor, the yieldingness (or stiffness) of the oscillatory system, etc., are taken into consideration. Among other things, the resonance frequency of the oscillatory system enters into the transfer function. As explained above, when an asymmetry with regard to the weight distribution occurs in the measuring tubes due to blockage, the oscillatory system has two (or, if necessary, still more in the case of more than two measuring tubes) resonance frequencies. These resonance frequencies differ from the resonance frequency of the oscillatory system when it is not blocked (for example, when all measuring tubes are completely emptied, or are filled with the same fluid). Due to this changed oscillatory behavior in the case of blockage, a change of the transfer function of the Coriolis flow measuring device occurs. On the basis of a change of the transfer function, blockage of a measuring tube can thus be established. Preferably, in such case, as given above in the further development, the excitation frequency is selected in such a manner, that it corresponds to a resonance frequency of the oscillatory system.

In an advantageous further development, in the step of analyzing, a deviation of the resonance frequencies is established by the fact that, when the at least two measuring tubes are excited at a resonance frequency of the oscillatory system, which includes the at least two measuring tubes, a reduction of the yieldingness of the oscillatory system occurs, as ascertained from the registered, mechanical oscillations of the measuring tubes. The ascertaining of the yieldingness occurs, in such case, by referencing a transfer function of the Coriolis flow measuring device, which function holds true for resonance conditions for an unblocked state. The yieldingness, which is generally known in the technical field, and is denoted here as $k_1$, does not actually change as a result of the blockage of a measuring tube. Rather, in the blocked state, the blocked measuring tube has a different resonance frequency than the at least one remaining measuring tube, as is explained above, due to an asymmetry with regard to the weight distribution. From this, there results a changed oscillatory behavior of the oscillatory system. This changed oscillatory behavior is no longer correctly described by the transfer function, which is true for an unblocked state under resonance conditions.

If the oscillatory system in blocked state is excited with one of the resonance frequencies of the oscillatory system, this excitation frequency lies nearer to the resonance frequency of the (at least) one measuring tube than to the resonance frequency of the (at least) one remaining measuring tube. This leads to the fact that (at least) one measuring tube shows a relatively good oscillation response behavior, while the (at least) one other measuring tube shows a relatively poor oscillation response behavior. Whether, now, the blocked, or the at least one, not blocked, measuring tube shows the relatively good oscillation response behavior, depends on which resonance frequency of the oscillatory system the excitation frequency is set to. The oscillatory system has, accordingly, a worse oscillation response behavior than in a non-blocked state.

The yieldingness $k_1$ can, among other ways, such as is explained subsequently with reference to the figures, be ascertained (in a non-blocked state) from the registered oscillation response behavior of the oscillatory system, when such is excited with a resonance frequency of the oscillatory system. In such case, entering into this calculation is also the transfer function of the Coriolis flow measuring device. If, now, in this calculating of the yieldingness, the transfer function is taken into consideration, which is true for a non-blocked state under resonance conditions and therewith describes incorrectly the oscillatory system in a blocked state, then this leads in the case of a state with a blocked measuring tube to the fact that a reduced yieldingness of the oscillatory system (relative to a non-blocked state) results therefrom.

In an advantageous further development, in the step of analyzing, a deviation of the resonance frequencies is established from the fact that, in the case of exciting the at least two measuring tubes at a resonance frequency of the oscillatory system, which has the at least two measuring tubes, an increasing of a stiffness of the oscillatory system ascertained from the registered, mechanical oscillations of the measuring tubes occurs. The determining of the stiffness occurs, in such case, by referencing a transfer function of the Coriolis flow measuring device holding for a non-blocked state under resonance conditions. The meaning of the term, stiffness, is generally known in the technical field. In corresponding manner, such as is explained above in reference to yieldingness, stiffness is not actually changed by the blockage of a measuring tube. Rather, again, as above explained, the oscillatory system, when a measuring tube is blocked, has a worse oscillation response behavior than in a non-blocked state, so that, when the stiffness according to the above named requirements is ascertained, an increased value for the stiffness is obtained. In such case, the above explanations made in reference to the determining of yieldingness hold in corresponding manner.

In an advantageous further development, in the step of analyzing, a deviation of the resonance frequencies is established, only when the difference of the ascertained, reduced yieldingness from the ascertained yieldingness in a non-blocked state and/or when the difference of the ascertained stiffness in a non-blocked state from the ascertained, increased stiffness, exceed(s) a predetermined limit value. In this way, small changes of the ascertained yieldingness and/or stiffness, which possibly can also be brought about due to other causes, are not taken into consideration. The limit value can, in such case, be fixed as a function of the respective application, for example, also by a user.

In an advantageous further development, in the step of analyzing, a deviation of the resonance frequencies is not established, when frequency fluctuations of the excitation frequency, which is controlled at a resonance frequency of the oscillatory system, are increased, especially when these frequency fluctuations exceed a predetermined limit value. If the yieldingness and/or the stiffness are/is ascertained according to the above explained further developments, then in the case of this determining, a reducing of the yieldingness, or an increasing of the stiffness can also be brought about due to gas inclusions, such as, for example, air bubbles, which are carried in the respective, flowing fluid and flow through the measuring tubes. In this case, however, also the resonance frequency of the oscillatory system varies due to the short-term changes of the fluid-properties. Accordingly, then, when the determining according to one of the above explained further developments shows a reduced yieldingness and/or an increased stiffness, checking the frequency fluctuations of the resonance frequency of the oscillatory system can allow it to be excluded, that the reduced yieldingness and/or the increased stiffness is brought about by entrained gas inclusions. Preferably, there is stored for the frequency fluctuation of the resonance frequency a limit value, which also, depending on application, can vary. The frequency fluctuation F can be calculated, for example, on the basis of the following Equation (0), wherein N is the number of values (e.g. various measurements) referenced for the calculation and $f_i$, in each case, the resonance frequency for an individual measurement i:

$$F = \frac{1}{N}\sum_{i=1}^{N} |f_i - f_{i-1}|. \tag{0}$$

In an advantageous further development, in the step of analyzing, a deviation of the resonance frequencies is not established, when a reducing of the yieldingness and/or an increasing of the stiffness occurs creepingly, especially below a predetermined limit value within a predetermined period of time. In this way, an increasing coating of the tube, or pipe, wall of at least one measuring tube or the occurrence of abrasive effects on the measuring tube inner walls, which, in each case, can lead to such a creeping, or continuous, change of the yieldingness and/or stiffness, can be excluded. A further factor, by which the determining of the yieldingness and/or the stiffness is influenced, is the temperature. In such case, as in the case of many Coriolis flow measuring devices already usual, the temperature is registered concurrently. Accordingly, it is preferably provided, that also a corresponding temperature compensation of the ascertained yieldingness and/or the ascertained stiffness is performed.

The present invention relates additionally to a Coriolis flow measuring device, which is insertable into a pipeline and is embodied in such a manner, that, by it, a physical measured variable, especially a mass flow, a viscosity and/or a density of a fluid flowing in the pipeline is ascertainable. The Coriolis flow measuring device includes: At least two measuring tubes, into which a fluid flowing in the pipeline is dividable; at least one exciter, by which the at least two measuring tubes are excitable to execute mechanical oscillations; and at least one sensor, by which mechanical oscillations of the measuring tubes are registerable and at least one measurement signal representing the mechanical oscillations can be produced. An electronics of the Coriolis flow measuring device, by which the at least one produced measurement signal is processed, is, in such case, embodied in such a manner that it analyzes at least one produced measurement signal for the occurrence of a deviation of a resonance frequency of one measuring tube relative to a resonance frequency of the at least one other measuring tube and in the case of occurrence of such a deviation indicates blockage of a measuring tube.

The advantages explained above in reference to the method of the invention are achieved in corresponding manner by the Coriolis, flow measuring device of the invention. In the case of the Coriolis, flow measuring device of the invention, the same further developments, which were explained above in reference to the method of the invention, are implementable in corresponding manner.

BRIEF DESCRIPTION OF THE DRAWINGS

Other advantages and utilities of the invention will become evident on the basis of the subsequent description of examples of embodiments with reference to the appended drawing, the figures of which show as follows.

DETAILED DISCUSSION IN CONJUNCTION WITH THE DRAWINGS

Figure 1:
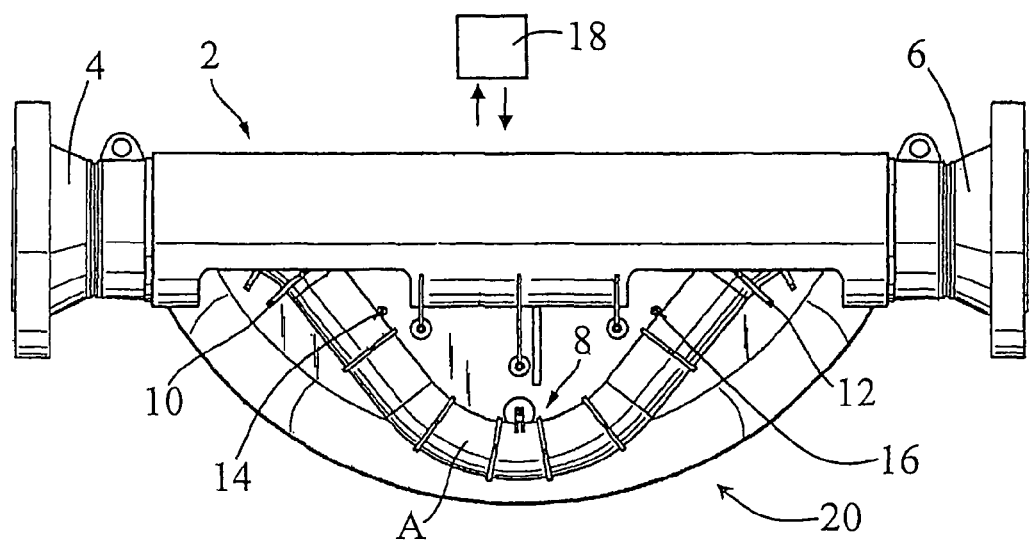
FIG. 1 shows by way of example, an illustration of a Coriolis, flow measuring device having two measuring tubes, in side view with partially removed housing.
Figure 2:
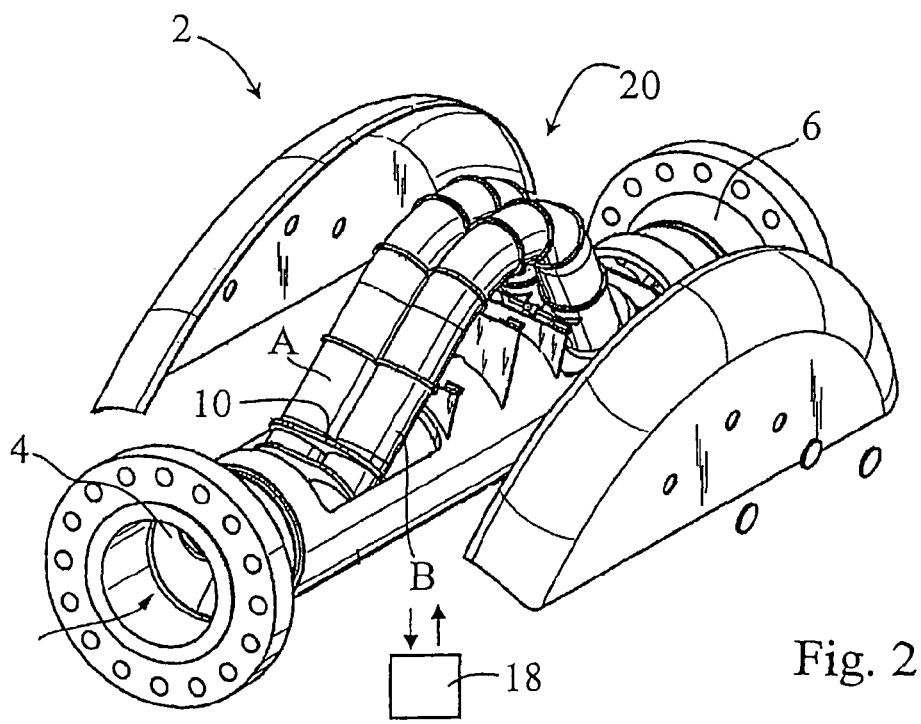
FIG. 2 shows the Coriolis, flow measuring device of FIG. 1, in perspective view with partially removed housing.

FIGS. 1 and 2 show, for example, a Coriolis, flow measuring device 2 suitable for application of the present invention. The Coriolis, flow measuring device 2 includes two oscillatably held, measuring tubes A and B, both of which are curved and extend in parallel with one another. The Coriolis, flow measuring device 2 is, in such case, installed in a pipeline (not shown) in such a manner, that the fluid flowing in the pipeline flows through both measuring tubes A and B. For this, the Coriolis, flow measuring device 2 includes on the input side a flow divider 4, by which the fluid is divided to the two measuring tubes A and B. On the output side in corresponding manner, a flow divider 6 is provided, by which the fluid emerging from the two measuring tubes A and B is guided back together and led to an outlet of the Coriolis, flow measuring device 2.

Extending between the two measuring tubes A and B is an exciter 8, which in the present example of an embodiment, is formed by an electrodynamic exciter 8. The exciter 8 is, in the present example of an embodiment, arranged at a point of reversal of the arc of each of the two measuring tubes A and B. Exciter 8 is embodied in such a manner that, by applying an electrical excitation voltage, the length of the exciter is changed. By applying a corresponding, periodic, electrical excitation voltage to the exciter 8, the two measuring tubes A and B can periodically be pushed apart and/or drawn together, so that they execute bending oscillations. In such case, the two measuring tubes A and B are excited with opposite phase relative to one another and each executes a swinging movement about a longitudinal axis of the Coriolis, flow measuring device 2. The two measuring tubes A and B are, additionally, mechanically coupled to one another on the input and output sides by corresponding coupling elements 10, 12.

Between the two measuring tubes A and B, in each case, on an inlet side and on an outlet side section of such, extend two sensors 14, 16, via whose length change, mechanical oscillations of the two measuring tubes A and B are registerable. In the present example of an embodiment, the two sensors 14, 16, register, in each case, change of separation between the two measuring tubes A, B, i.e. their combined amplitude. The sensors 14, 16 are, for example, formed by electrodynamic sensors. For a measuring of the mass flow, the two sensors 14, 16 can register, among other things, a phase shift of the oscillations of the measuring tubes A, B along the direction of elongation of the two measuring tubes A, B and therefrom the mass flow can be calculated.

The exciting of the exciter 8 by applying a corresponding excitation voltage as well as the evaluation of the measurement signals provided by the sensors 14, 16 occurs by a correspondingly embodied electronics 18, which is shown in FIGS. 1 and 2 only schematically by a box. Especially, the electronics 18 is embodied in such a manner that, by it, an exciting of the oscillatory system 20, which has the two measuring tubes A, B, is controllable in such a manner that the oscillatory system is excited at a resonance frequency of the fundamental mode of the bending oscillation. Such a control of the excitation frequency can occur, for example, on the basis of an evaluation of at least one measurement signal of the sensors 14, 16. Especially, such a control can occur in such a manner, that the phase shift between the (periodic) exciting and a (periodic) measurement signal of at least one of the sensors 14, 16 (i.e. the phase of the forced oscillation) amounts to 90°. Additionally, the electronics is embodied in such a manner that, by it, the exciting of the oscillatory system 20 is controllable in such a manner, that the oscillatory system 20 oscillates with a constant, combined amplitude. This means, that the exciting is controlled in such a manner that the maximum distance between the two measuring tubes A, B achieved in the case of the executed oscillations is constant (independent of excitation frequency). As above explained with reference to the transfer function, accordingly, the excitation input variable, such as, for example, the maximum excitation voltage applied to the exciter 8, must be controlled on the basis of at least one measurement signal of at least one of the sensors 14, 16, especially on the basis of the sensor voltage. Additionally, or alternatively, to the above explained controls, the electronics 18 can also be embodied in such a manner that, by it, an alternative oscillatory behavior of the oscillatory system 20 is adjustable. For example, also in the case of a constant excitation input variable, the changes of the measurement signal, especially the amplitude of the oscillation, can be analyzed.

Due to the symmetric construction of the two measuring tubes A, B, these have, to the extent that they are, in each case, equally filled, or empty (and, therewith, a symmetric weight distribution is present), in each case, the same resonance frequency (of the relevant oscillation mode). If they are excited in the above explained manner to execute oscillations, then they oscillate with equal amplitude, opposite phase, relative to one another. The oscillatory system, which has the two measuring tubes, has (in the relevant oscillation mode), accordingly, only one resonance frequency. In the case of a type of a Coriolis flow measuring device, which had two measuring tubes in the above configuration explained with reference to FIGS. 1 and 2, in an experiment with complete filling of the two measuring tubes with water, a resonance frequency of the oscillatory system, which has the two measuring tubes, of 651.56 Hz (Hertz) was ascertained. In the case of a complete filling of the two measuring tubes with air, in an experiment, a resonance frequency of 871.73 Hz was ascertained. From this, it is evident, among other things, that the resonance frequency, in each case, correlates with the density of the particular fluid in the measuring tubes.

Figure 3:
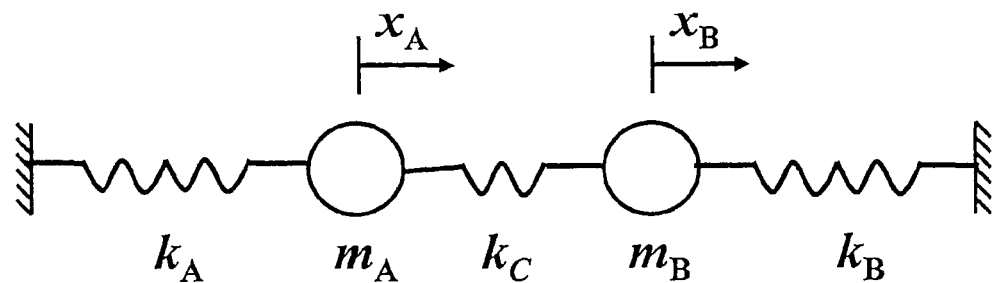
FIG. 3 is a model representation of an oscillatory system, which has two measuring tubes.

The oscillatory system, which has two measuring tubes A and B, can be illustrated by the model shown in FIG. 3. In such case, $m_A$ and $m_B$ are the masses of the measuring tubes A and B, respectively, $k_A$ and $k_B$ the spring constants of the measuring tubes A and B, respectively, and $x_A$ and $x_B$ the deflections of the measuring tubes A and B, respectively. The spring constant $k_C$ described the mechanical coupling between the two measuring tubes A and B. If into this model are input the above set forth resonance frequencies ascertained experimentally for complete filling with water, or with air, then by calculation it can be ascertained, that the oscillatory system has, in the case of a filling of one measuring tube with water and of one measuring tube with air, two different resonance frequencies. One of these calculated resonance frequencies, which has presently a value of 639.75 Hz, lies, in such case, nearer to the resonance frequency holding for a complete filling with water. The other of these calculated resonance frequencies, which has presently a value of 857.72 Hz, lies nearer the resonance frequency for a complete filling with air. These results could be confirmed experimentally. Experimentally, it is to be taken into consideration, that in the case of a control of the excitation frequency to the (or a) resonance frequency of the oscillatory system, the electronics of the Coriolis flow measuring device, depending on applied control algorithm and depending on starting value of the excitation frequency of the excitation frequency, controls to one of the two resonance frequencies.

Furthermore, there results from the calculations that, in the case of a filling of one measuring tube with water and one measuring tube with air, in the case of the resonance frequency of 857.72 Hz, the amplitude ratio of the one measuring tube to the other measuring tube amounts to −0.0435. Therefrom, it is evident that, in the case of the resonance frequency (857.72 Hz), which lies further removed from the resonance frequency of the oscillatory system in the case of a pure filling with water (651.56 Hz), the measuring tube filled with water oscillates with a clearly smaller amplitude than the measuring tube filled with air. The minus sign of the amplitude ratio indicates that the two measuring tubes oscillate with opposite phase relative to one another. In the case of a filling of one measuring tube with water and one measuring tube with air, at the resonance frequency of 639.75 Hz, the amplitude ratio of the one measuring tube to the other measuring tube amounts to +12.84. Therefrom, it is evident, that in the case of the resonance frequency (639.75 Hz) further removed from the resonance frequency of the oscillatory system in the case of a pure filling with air (871.73 Hz), the measuring tube filled with air oscillates with a clearly smaller amplitude than the measuring tube filled with water.

As evident from the model calculations and such as was confirmed experimentally, the oscillatory system, which has the two measuring tubes, has, at blockage of one measuring tube (to the extent that thereby an asymmetric weight distribution between the two measuring tubes occurs), two resonance frequencies (in the relevant oscillation mode). If the oscillatory system has more than two measuring tubes, then, in corresponding manner, also a number of resonance frequencies of the oscillatory system can occur.

As above explained, the occurrence of a plurality of resonance frequencies can be established from the fact that at least two marked peaks at, in each case, different frequencies occur in a frequency spectrum of an analyzed measurement signal (e.g. of one of the sensors 14, 16). This was confirmed by the following experiment. For this, in contrast with the above explained control of the excitation frequency to the resonance frequency of the oscillatory system, the oscillatory system was excited in such a manner, that the excitation frequencies have a frequency band extending uniformly over the relevant frequency range. The "relevant frequency range" includes, in such case, at least the frequencies, which come in question for peaks in the frequency spectrum, and this depends on the particular densities of the fluids, or fillings, and the particular Coriolis flow measuring device. Such a frequency distribution is also referred to as "white noise". In the performed experiment, the Coriolis flow measuring device had, again, two measuring tubes arranged symmetrically relative to one another.

As above explained with reference to FIGS. 1 and 2, the oscillations of the oscillatory system, which has the two measuring tubes, were registered via corresponding sensors, wherein by individual sensors, in each case, the combined amplitude of the oscillations of the two measuring tubes (i.e. their change of separation) was registered. In the experiment, for different fillings of the measuring tubes, one of the measurement signals, which was provided by a sensor and which represents the mechanical oscillations of the two measuring tubes, was evaluated in a spectrum analyzer. The spectra obtained in such case are presented in FIGS. 4 to 7 and are explained in the following. In such case, in FIGS. 4 to 7, in each case, amplitude of the oscillation is plotted versus frequency of the oscillation (unit: Hz).

Figure 4:
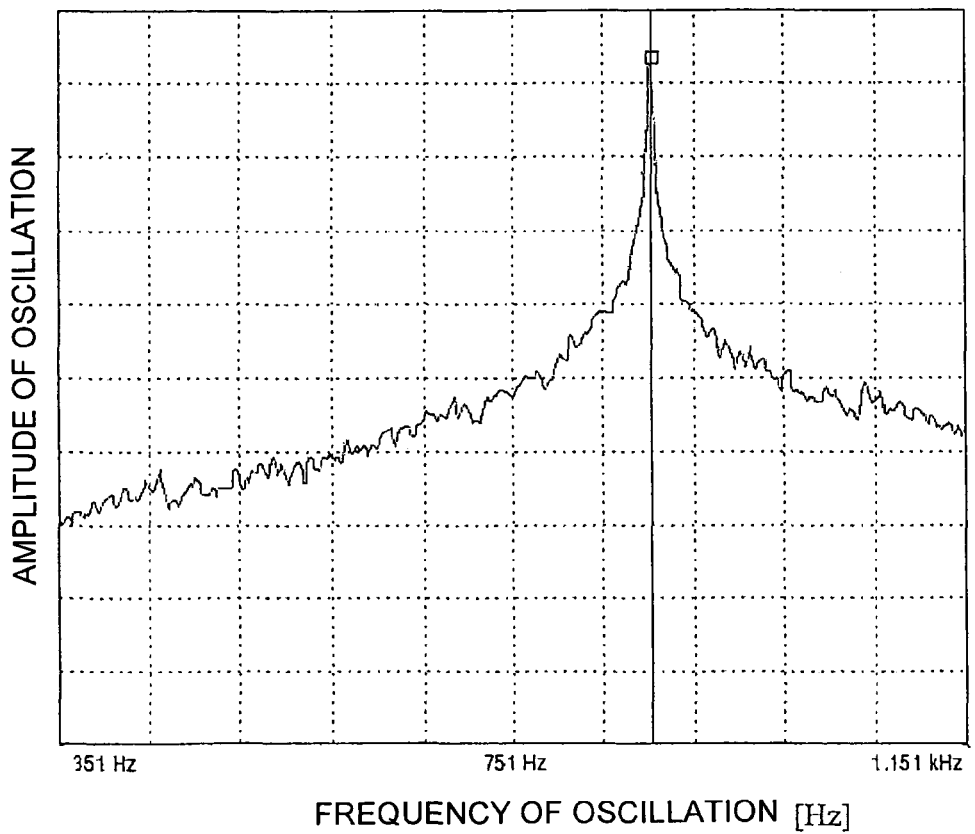
FIG. 4 is a graph of a frequency spectrum of an analyzed measurement signal from a measuring, in the case of which the two measuring tubes of a Coriolis flow measuring device were filled with air.
Figure 5:
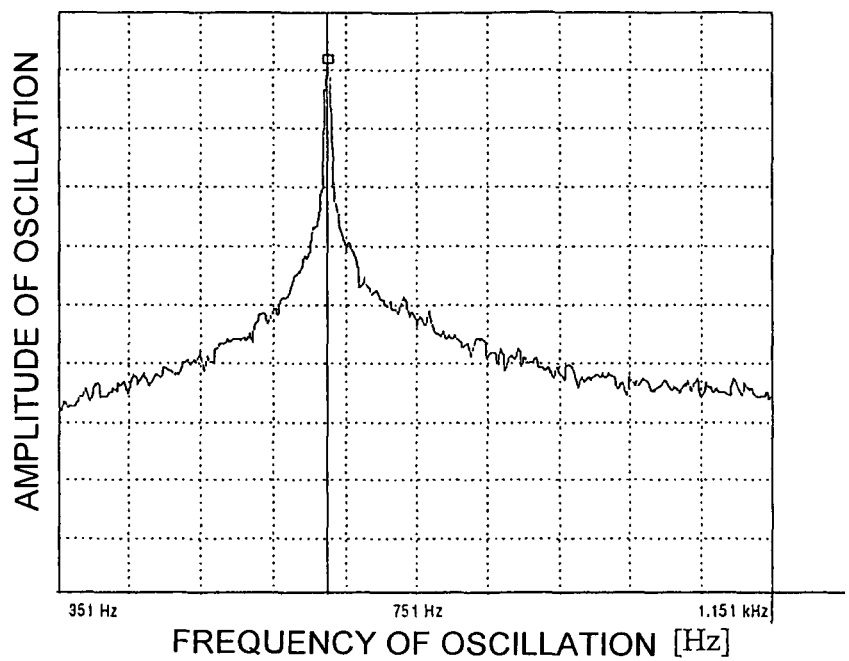
FIG. 5 is a graph of a frequency spectrum of an analyzed measurement signal from a measuring, in the case of which the two measuring tubes of a Coriolis flow measuring device were filled with water.
Figure 6:
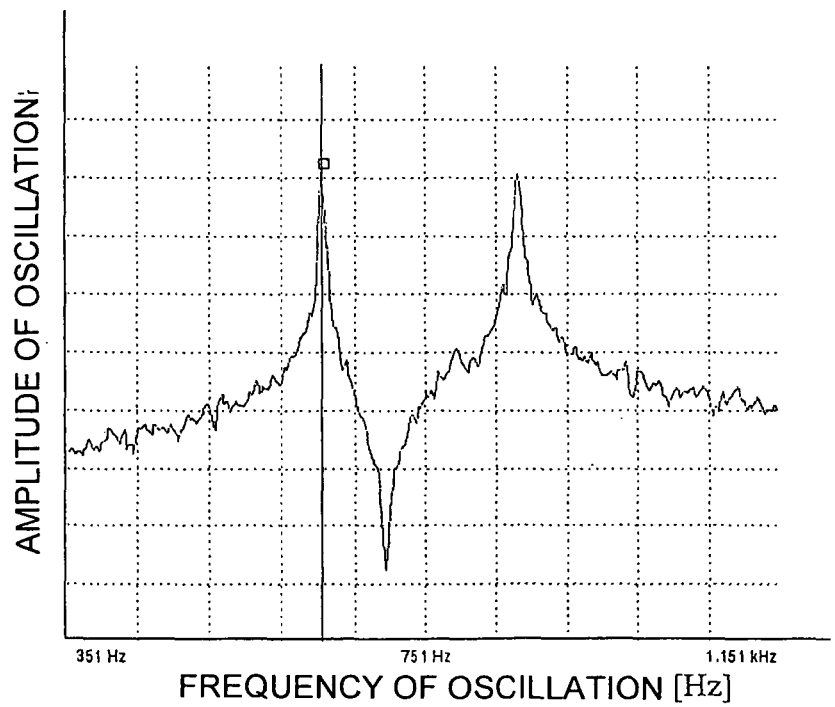
FIG. 6 is a graph of a frequency spectrum of an analyzed measurement signal from a measuring, in the case of which one measuring tube of a Coriolis flow measuring device was filled with air and the other measuring tube with water.
Figure 7:
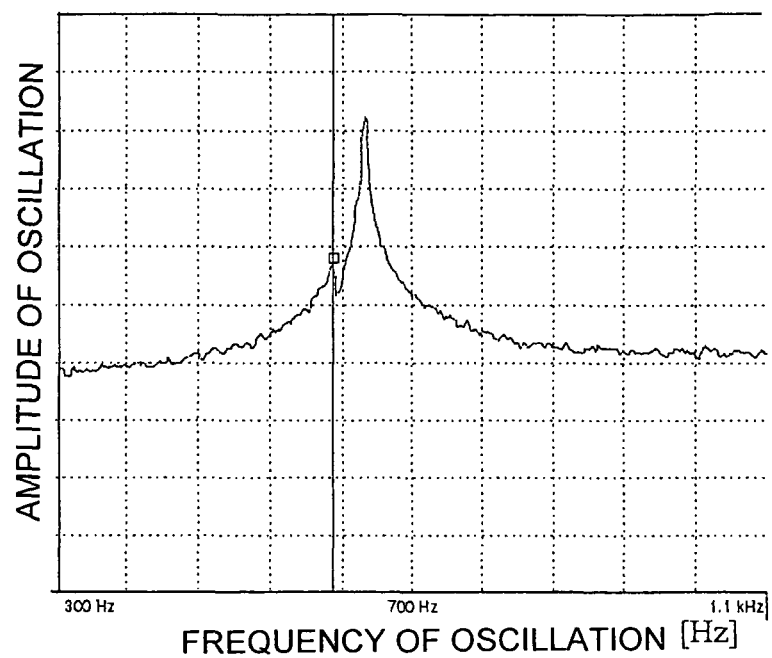
FIG. 7 is a graph of a frequency spectrum of an analyzed measurement signal from a measuring, in the case of which one measuring tube of a Coriolis flow measuring device was filled with water and the other measuring tube with ketchup.

@FIG. 4 shows the frequency spectrum of a measuring, in the case of which the two measuring tubes were filled with air. FIG. 5 shows the frequency spectrum of a measuring, in the case of which the two measuring tubes were filled with water. In the case of both frequency spectra, it is evident, that, in each case, only one marked peak occurs. In the case of the measuring of FIG. 4, this lies at a frequency of 871.73 Hz (air) and in the case of the measuring of FIG. 5 at 651.56 Hz (water).

In an additional measuring, one measuring tube was filled with air and one measuring tube with water and the measurement signal obtained in such case was evaluated by the spectrum analyzer. In such case, the frequency spectrum shown in FIG. 6 was obtained. As evident on the basis of FIG. 6, the frequency spectrum has two marked peaks. As above explained on the basis of the model calculation, in such case, one of the peaks lies, as expected, relatively near to the resonance frequency, which holds for a filling of both measuring tubes with water, and the other peak lies relatively near to the resonance frequency, which holds for a filling of both measuring tubes with air.

In an additional measuring, one measuring tube was filled with water and one measuring tube with ketchup and the measurement signal obtained in such case was evaluated by the spectrum analyzer. In such case, the frequency spectrum shown in FIG. 7 was obtained. Again, the frequency spectrum has two marked peaks, wherein the frequency difference of the frequencies, at which the peaks occur, is clearly smaller than in the case of the measuring illustrated in FIG. 6. This can be explained by the fact that the density difference between ketchup and water is not as great as that between air and water and, thus, the resonance frequencies of the two measuring tubes do not differ as strongly as in the case of fillings with air and water.

The frequency analysis and the determination, that two or a number of peaks occur in the frequency spectrum, can, in such case, also be performed by a correspondingly adapted electronics of the Coriolis flow measuring device. In such case, there are, such as explained above in the general part of the description, different methods familiar to those skilled in the art, for obtaining a frequency spectrum of the analyzed measurement signal. Especially, instead of the practice explained above of exciting via a broad frequency range, also the excitation frequency can be moved through, or varied, and, in each case, the oscillation response behavior of the oscillatory system registered.

As explained above, blockage of a measuring tube (to the extent that thereby an asymmetric weight distribution is present) can also be established by observing a change of a transfer function of the Coriolis flow measuring device relative to the transfer function in a non-blocked state. As above explained, the transfer function provides, in such case, a relationship between an excitation input variable of the Coriolis flow measuring device and a measurement signal representing the mechanical oscillations (of the oscillatory system). For example, the transfer function gives the particular relationships between the excitation voltage and an excitation electrical current, between the excitation electrical current and an excitation force, between the excitation force and an amplitude of the deflection of the sensor, between the amplitude of the deflection of the sensor and a speed of the deflection change of the sensor (or of the oscillation), between the speed of the deflection change of the sensor and a sensor voltage, as well as between the sensor voltage and a voltage actually output from a sensor electronics after a device-internal processing, wherein these variables, from the exciting up to the obtaining of the measurement signal, are processed in the Coriolis flow measuring device in the given sequence. The transfer function can differ, depending on device; especially, the individual factors, which describe the above set forth relationships, can deviate from one another.

As above described, entering into the transfer function are, among other things, the yieldingness (or, alternatively, the stiffness) of the oscillatory system, as well as also the resonance frequency of the oscillatory system. These two variables enter especially in a factor a, which describes the changing of the excitation force exerted by the at least one exciter and the amplitude of the deflection of the sensor.

As known to those skilled in the art, by referencing the differential equation, which describes the oscillatory system, and by referencing the transfer function, which holds for the Coriolis flow measuring device in a non-blocked state, the yieldingness $k_1$ for the case, that the system is located in resonance, can be ascertained on the basis of the following Equation (1):

$$k_1 = \frac{1}{e_D Q D} \quad (1)$$

In Equation (1), $e_D$ is the exciter efficiency. The exciter efficiency $e_D$ forms, in such case, a part of the transfer function and gives the ratio between the excitation force $F_D$ and the excitation electrical current $I_D$. The exciter efficiency $e_D$ is, accordingly, a device-specific variable, which, depending on type of exciter, can have different values. The excitation electrical current $I_D$ and the excitation force $F_D$ of the at least one exciter were explained above in reference to the transfer function. This ratio is given in the following Equation (2):

$$e_D = \frac{F_D}{I_D} \quad (2)$$

In Equation (1), D is the damping. The damping D is, in such case, formed by the ratio of the excitation electrical current $I_D$ to the amplitude of the deflection of the sensor $X_S$. Also the amplitude of the deflection of the sensor $X_S$ was explained above in reference to the transfer function. The relationship for calculating damping D is given in the following Equation (3):

$$D = \frac{I_D}{X_S} \quad (3)$$

Q in Equation (1) is the quality factor. This describes the decay behavior of the oscillation of the oscillatory system after an exciting of the same. Experimentally, the quality factor Q can be calculated on the basis of the following Equation (4), wherein, for this, the oscillatory system first is excited (with the resonance frequency) and then the exciting interrupted, with the decay behavior of the oscillation being recorded.

$$Q = \frac{\omega_0 (t_2 - t_1)}{2 \ln\left(\frac{Y_1}{Y_2}\right)} \quad (4)$$

Following interruption of the exciting, the oscillatory system oscillates further, with the amplitude of the oscillation falling with increasing time. As known in the technical field, in such case, the envelope curve of the oscillation describes the decay behavior of the amplitude of the oscillation. For ascertaining the quality factor Q, for example, the envelope curve, by which the decay behavior of the amplitude of the oscillation is described, is registered by a corresponding measuring. The times $t_1$ and $t_2$ are, in such case, two points in time following one after the other and $Y_1$ and $Y_2$ are, in such case, the amplitudes of the oscillation (which are, for example, obtained from the envelope curve), in each case, associated with these points in time. The term $\omega_0$ is the resonance frequency of the oscillatory system.

Accordingly, the yieldingness $k_1$ can be ascertained on the basis of Equations (1)-(4) from the oscillatory behavior of the oscillatory system, which has the at least two measuring tubes.

With a Coriolis flow measuring device, which had two measuring tubes and essentially the configuration explained above with reference to FIGS. 1 and 2, different measurements were performed, in the case of which the two measuring tubes were filled with different fluids, or materials, and therefrom, in each case, the yieldingness $k_1$ and the damping D ascertained in the above described manner. The results achieved in such case are presented in FIG. 8, wherein damping D (unit: A/m: Ampere/meter) is plotted versus yieldingness $k_1$ (unit: m/N: meters/Newton).

Figure 8:
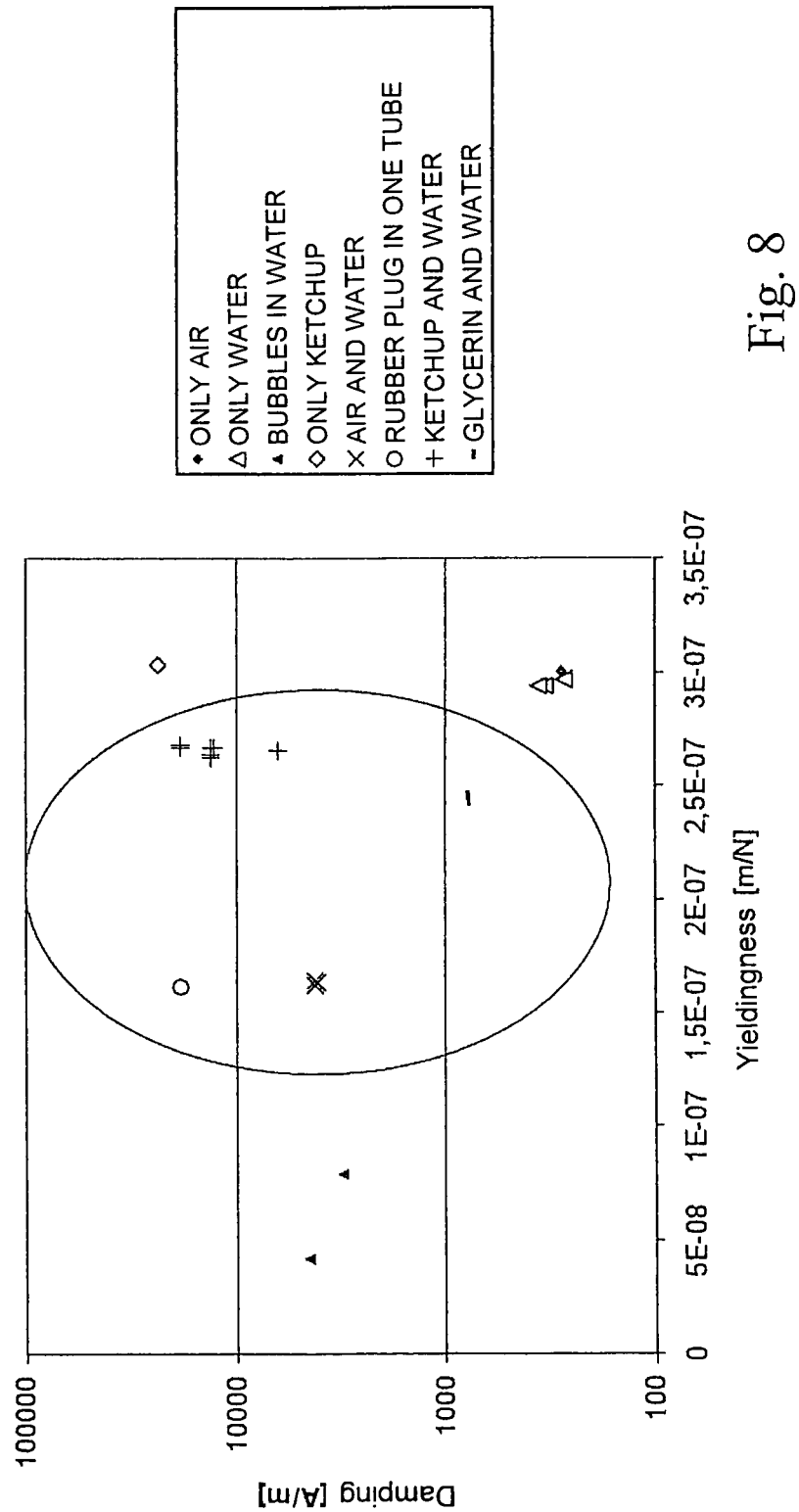
FIG. 8 is a graph of damping versus yieldingness for different measurements performed with various fillings of the two measuring tubes of a Coriolis flow measuring device.

In FIG. 8, the solid diamond is for a measuring, in the case of which the two measuring tubes were filled with air. The three open triangles directly beside show, in each case, measurements, in the case of which the two measuring tubes were filled with water. The open diamond is for a measuring, in the case of which the two measuring tubes were filled with ketchup. On the basis of these measurements, it is evident that the yieldingness $k_1$ ascertained in the different measurements is largely identical, in spite of the different densities and viscosities of the particular fluids. This result is as expected, since the yieldingness $k_1$ is a device-specific variable, which is independent of the filling of the measuring tubes.

All measurements within the ellipse are for measurements, in the case of which the two measuring tubes were differently filled and therewith an asymmetric weight distribution between the two measuring tubes was present. Especially, the two measurements indicated by xs are for measurements, in the case of which one measuring tube was filled with water and one measuring tube with air. The measuring indicated by a circle is for a measuring, in the case of which a rubber plug was in one measuring tube, while the other measuring tube was empty. The seven measurements indicated by the plus signs are for measurements, in the case of which one measuring tube was filled with water and one measuring tube with ketchup. The two measurements indicated by the minus signs are for measurements, in the case of which one measuring tube was filled with glycerin and one measuring tube with water.

On the basis of all measurements within the ellipse, it is evident that, relative to a symmetric filling of the measuring tubes, an asymmetric filling shows a reduced yieldingness and, as a rule, also a higher damping. In some cases, yieldingness is reduced to half the original value. The reducing of the yieldingness is greater, the greater the density difference between the two fluids, or materials, i.e. the larger the difference in the weight distribution between the two measuring tubes. Accordingly, it is experimentally confirmed, that the occurrence of a blockage (to the extent that thereby an asymmetric weight distribution between the measuring tubes occurs) can be established, when, in the case of exciting of the at least two measuring tubes at a resonance frequency of the oscillatory system, a reducing of the ascertained yieldingness $k_1$ of the oscillatory system occurs.

In FIG. 8, the two measurements in the form of solid triangles are for a measuring, in the case of which water was flowing through the two measuring tubes and bubbles were entrained in the water. On the basis of these measurements, it is evident, that the entrainment of gas inclusions likewise can lead to a reducing of the ascertained yieldingness $k_1$. As above explained, in such a case also the frequency fluctuations of the excited frequency, which is controlled to the resonance frequency of the oscillatory system, are increased. By ascertaining these frequency fluctuations, this case can, accordingly, be excluded.

The present invention is not limited to the examples of embodiments explained with reference to the figures. As above explained, especially, different measuring tube configurations (especially different forms of the measuring tubes and also more than only two measuring tubes) are possible. Also the exciting of the measuring tubes to execute oscillations and the registering of the oscillations of the measuring tubes can occur in different ways. For example, the measuring tubes can also be individually excited and their amplitudes individually registered via corresponding sensors. Also type and number of the used sensors and exciters can deviate from the described sensors and the described exciter. If the Coriolis flow measuring device has more than two measuring tubes, then, in corresponding manner, also the blockage of two (or more) measuring tubes can be detected. These were, for reasons of clarity of the formulation, not explicitly noted each time.

The invention claimed is:

1. A method for detecting blockage of a measuring tube of a Coriolis flow measuring device, said Coriolis flow measuring device being insertable into a pipeline and embodied in such a manner that, by it, a physical measured variable of a fluid flowing in the pipeline is ascertainable, and Coriolis flow measuring device including at least two measuring tubes, into which a fluid flowing in the pipeline is dividable, said method comprising:
exciting the at least two measuring tubes by at least one exciter to execute mechanical oscillations;
registering mechanical oscillations of the measuring tubes and producing by at least one sensor at least one measurement signal representing the mechanical oscillations;
analyzing at least one produced measurement signal for the occurrence of a deviation of a resonance frequency of one measuring tube relative to a resonance frequency of the at least one other measuring tube; and
establishing blockage of a measuring tube in the case of occurrence of such a deviation.

2. The method as claimed in claim 1, wherein:
the at least two measuring tubes are coupled mechanically to one another and form an oscillatory system.

3. The method as claimed in claim 1, wherein:
the at least two measuring tubes are excited together, and/or
a relative change of separation between measuring tubes, is registered for registering mechanical oscillations of the measuring tubes.

4. The method as claimed in claim 1, wherein:
for exciting the at least two measuring tubes, an excitation frequency of the at least two measuring tubes is controlled at a resonance frequency of an oscillatory system, which includes the at least two measuring tubes.

5. The method as claimed in claim 1, wherein:
the occurrence of a deviation of the resonance frequencies is established by the fact that, in a frequency spectrum of an analyzed measurement signal, at least two marked peaks occur at different frequencies; and
the analyzed measurement signal represents mechanical oscillations of an oscillatory system, which includes the at least two measuring tubes.

6. The method as claimed in claim 5, wherein:
the occurrence of a deviation of the resonance frequencies is established only when a frequency difference of the frequencies, at which the peaks occur, exceeds a predetermined limit value.

7. The method as claimed in claim 5, wherein:
the frequency spectrum is provided by varying the excitation frequency of the at least one exciter and by registering associated oscillation response behavior of the oscillatory system by at least one sensor.

8. The method as claimed in claim 5, wherein:
in the case of an exciting, which has as excitation frequencies a frequency band extending over a relevant frequency range, the frequency spectrum is provided by Fourier analysis of the, in such case, registered, analyzed measurement signal.

9. The method as claimed in claim 1, wherein:
a deviation of the resonance frequencies is established by the fact that, in the case of exciting of the at least two measuring tubes at a resonance frequency of the oscillatory system, which includes the at least two measuring tubes, a change of a transfer function of the Coriolis flow measuring device occurs relative to the transfer function in a non-blocked state,
said transfer function relating an excitation input variable, to a measurement signal representing the mechanical oscillations.

10. The method as claimed in claim 1, wherein:
said deviation of the resonance frequencies is established by the fact that, in the case of exciting of the at least two measuring tubes at a resonance frequency of the oscillatory system, which includes the at least two measuring tubes a reducing of a yieldingness of the oscillatory system ascertained from the registered, mechanical oscillations of the measuring tubes occurs,
said yieldingness being ascertained with reference to a transfer function of the Coriolis flow measuring device holding for a non-blocked state under resonance conditions,
said transfer function relating an excitation input variable to a measurement signal representing the mechanical oscillations.

11. The method as claimed in claim 1, wherein:
said deviation of the resonance frequencies is established by the fact that, in the case of exciting of the at least two measuring tubes at a resonance frequency of the oscillatory system, which includes the at least two measuring tubes,
an increasing of a stiffness of the oscillatory system ascertained from the registered mechanical oscillations of the measuring tubes occurs
said stiffness being ascertained with reference to a transfer function of the Coriolis flow measuring device holding for a non-blocked state under resonance conditions,
said transfer function relating an excitation input variable to a measurement signal representing the mechanical oscillations.

12. The method as claimed in claim 10, wherein:
said deviation of the resonance frequencies is established only when the difference of the ascertained reduced yieldingness from the ascertained yieldingness in a non-blocked state; and/or
said deviation of the resonance frequencies is established only when the difference of the ascertained stiffness in a non-blocked state from the ascertained increased stiffness exceeds a predetermined limit value.

13. The method as claimed in claim 9, wherein:
a deviation of the resonance frequencies is not established, when frequency fluctuations of the excitation frequency, which is controlled at a resonance frequency of the oscillatory system, are increased.

14. The method as claimed in claim 10, wherein:
a deviation of the resonance frequencies is not established, when a reducing of the yieldingness and/or an increasing of the stiffness occurs creepingly.

15. A Coriolis flow measuring device, which is insertable into a pipeline and is embodied in such a manner that, by it, a physical measured variable Coriolis flow measuring device comprising:
at least two measuring tubes, into which a fluid flowing in the pipeline is dividable;
at least one exciter, by which the at least two measuring tubes are excitable to execute mechanical oscillations;
at least one sensor, by which mechanical oscillations of the measuring tubes are registerable and at least one, measurement signal representing the mechanical oscillations can be produced; and
an electronics, by which the at least one produced measurement signal is processed, said electronics is adapted to analyze at least one produced measurement signal for the occurrence of a deviation of a resonance frequency of one measuring tube relative to a resonance frequency of the at least one other measuring tube and to establish, in the case of occurrence of such a deviation, blockage of a measuring tube.

16. The method as claimed in claim 1, wherein:
the physical measured variable is one of a mass flow, a viscosity and/or a density of the fluid flowing in the pipeline.

17. The method as claimed in claim 1, wherein
the at least two measuring tubes (A, B) are excited in opposed directions by change of their relative separation.

18. The method as claimed in claim 1, wherein:
a relative change of separation between two measuring tubes (A, B) is registered for registering mechanical oscillations of the measuring tubes.

19. The method as claimed in claim 9, wherein:
a deviation of the resonance frequencies is not established, when frequency fluctuations of the excitation frequency, which is controlled at a resonance frequency of the oscillatory system (20), exceed a predetermined limit value.

20. The method as claimed in claim 1, further comprising:
recording the measurement signal for providing a Fourier analysis of the at least one measurement signal.

21. A method for operating a Coriolis flow measuring device inserted in a pipeline and adapted to ascertain a physical measured variable of a fluid flowing in the pipeline, said Coriolis flow measuring device including:
at least two measuring tubes are coupled mechanically to one another and form an oscillatory system, at least one exciter adapted to execute mechanical oscillations of said at least two measuring tubes, and at least one sensor adapted to register an oscillation response behavior of said oscillatory system, said at least two measuring tubes being adapted to divide a fluid flowing in the pipeline such that fluid flows through said at least two measuring tubes, said method comprising:
exciting the at least two measuring tubes by said at least one exciter to execute mechanical oscillations of said at least two measuring tubes;
registering mechanical oscillations of the measuring tubes and producing by said at least one sensor at least one measurement signal representing the mechanical oscillations;
varying an excitation frequency of the at least one exciter and registering an associated oscillation response behavior of the oscillatory system by said at least one sensor for providing a frequency spectrum;
controlling the excitation frequency of the at least two measuring tubes at a resonance frequency of said oscillatory system;
analyzing said frequency spectrum; and
detecting a blockage of one of said at least two measuring tubes when at least two marked peaks occur at different frequencies in said frequency spectrum.

22. The method as claimed in claim 21, wherein:
said at least two marked peaks exhibit a predetermined minimum frequency separation.

23. The method as claimed in claim 21, wherein:
the frequency spectrum is provided by a Fourier analysis of the at least one measurement signal.

24. The method as claimed in claim 21, wherein:
for varying the excitation frequency of the at least one exciter includes the excitation frequency passes through a frequency range, which, with regard to the evaluation of the frequency spectrum, is relevant.

25. The method as claimed in claim 21, further comprising:
recording the measurement signal for providing a Fourier analysis of the at least one measurement signal.

* * * * *